United States Patent [19]

Bohnenstingl et al.

[11] 4,049,385
[45] Sept. 20, 1977

[54] APPARATUS FOR CARRYING OUT CHLORINATING REACTIONS

[75] Inventors: Josef Bohnenstingl; Manfred Laser, both of Julich; Günter Lossmann; Helmut Gebhard, both of Bonn, all of Germany

[73] Assignee: Kernforschungsanlage Julich Gesellschaft mit beschrankter Haftung

[21] Appl. No.: 644,888

[22] Filed: Dec. 29, 1975

Related U.S. Application Data

[63] Continuation of Ser. No. 428,327, Dec. 26, 1973, abandoned.

[30] Foreign Application Priority Data

Dec. 22, 1972 Germany .............................. 2262881

[51] Int. Cl.$^2$ .............................. B01J 8/08; H05B 3/62
[52] U.S. Cl. .................................... 23/277 R; 13/20; 23/262; 23/284
[58] Field of Search ................. 23/277 R, 284, 252 A, 23/262; 423/439; 13/22, 23, 35, 20

[56] References Cited

U.S. PATENT DOCUMENTS

| | | | |
|---|---|---|---|
| 2,681,943 | 6/1954 | Hartwick | 23/277 R X |
| 2,788,260 | 4/1957 | Rick | 23/277 R X |
| 2,849,293 | 8/1958 | Wendell, Jr. et al. | 23/277 R X |
| 3,058,817 | 10/1962 | Irani | 23/284 |
| 3,124,425 | 3/1964 | Richelsen | 23/277 R |
| 3,147,331 | 9/1964 | Brugger | 23/277 R X |
| 3,343,920 | 9/1967 | Lowe | 23/277 R |

Primary Examiner—Joseph Scovronek
Attorney, Agent, or Firm—Walter Becker

[57] ABSTRACT

An apparatus for carrying out chlorinating reactions when extracting metals such as titanium, zirconium or the like during the extraction of uranium and thorium during the reprocessing of burned-off fuel and/or breeder elements for core reactors and during the purification of coal and graphite. The device comprises a shaft or blast furnace which is heated by a direct flow of current and while being coaxially surrounded by a mantle or shell communicates through a connection or adapter piece with a subsequent condenser of graphite. The device according to the present invention is characterized primarily in that the shell of the furnace and the adapter piece connecting the furnace with the condenser are made of graphite. The shell of the furnace, the condenser and the adapter piece connecting the shell with the condenser are arranged within a steel casing designed in a gas-tight manner.

4 Claims, 1 Drawing Figure

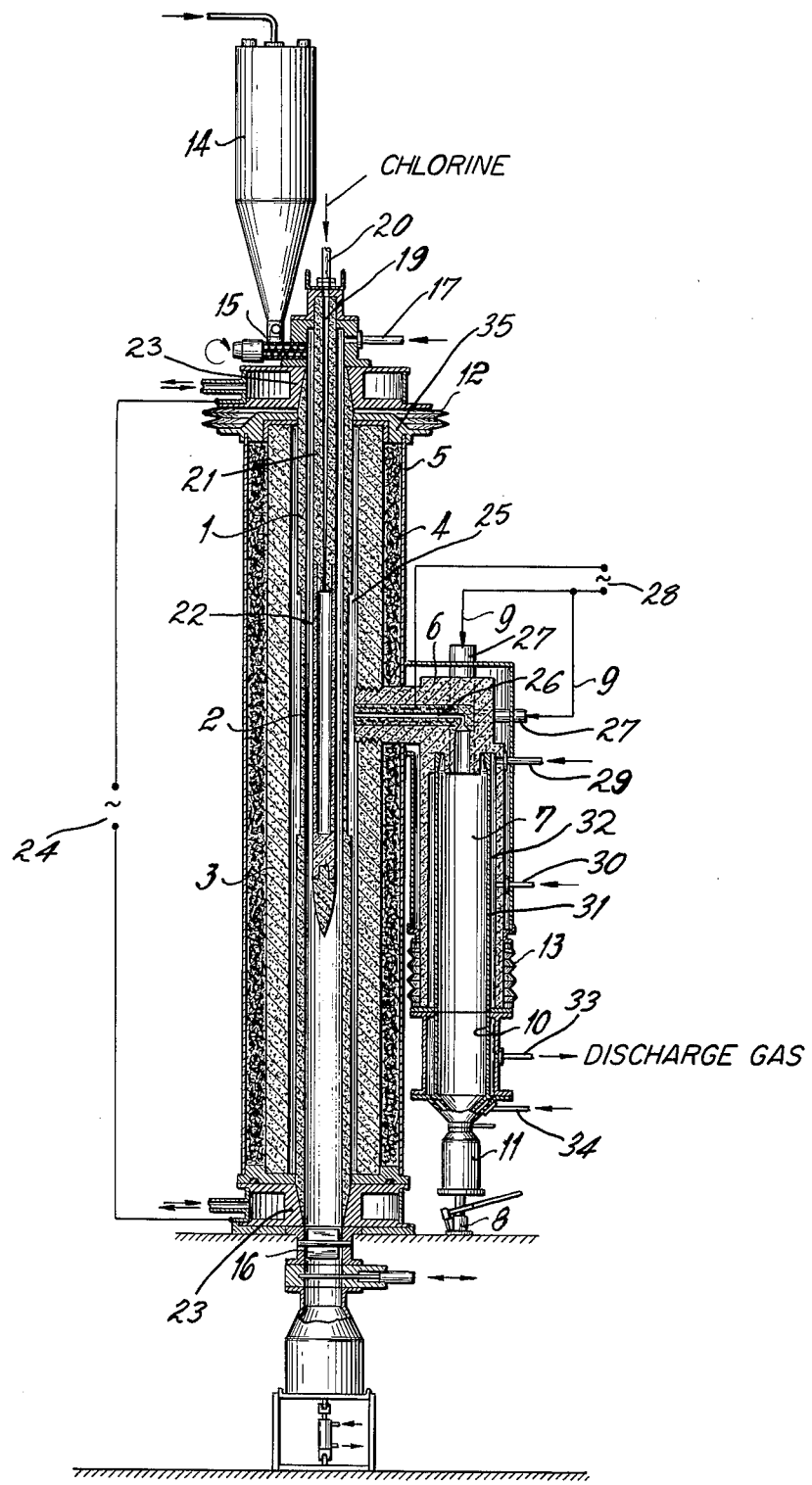

APPARATUS FOR CARRYING OUT CHLORINATING REACTIONS

This is a continuation application of Ser. No. 428,337— Bohnenstingl et al filed Dec. 26, 1973 and now abandoned.

The present invention relates to a device for carrying out chlorinating reactions in connection with the extraction of metals such as titanium, zirconium or the like when extracting uranium and thorium during the reprocessing of burned-off fuel and/or breeder elements for core reactors as well as when purifying coal and graphite. Such apparatus consists of a graphite shaft or blast furnace which is heated by a direct flow of current and while being coaxially surrounded by a mantle communicates through a connection or adapter piece with a subsequent condenser of graphite.

A chlorinating reactor is known the main component of which is formed by a heated graphite tube. With this known reactor, this graphite tube is surrounded by a ceramic pipe forming the shell therefore and has a connecting or adapter piece through which the graphite tube forming the reaction vessel proper is rigidly and in a gas-tight manner connected to a condenser for the substances which volatize during the chlorinating process. If, as it is customary in practice, quartz material is employed as ceramic material for the shell, for which quartz material there is used for instance a material known under the trademark Rotosil, the necessary gas seal is obtained for the processing of highly radioactive substances. It is also advantageous that the expansion in length of the quartz material as it is caused by the changes in temperature is only minor and that at a temperature above 1000° C., the plasticity of the quartz material is such that in the connecting piece between the furnace and the condenser no tension stresses will occur due to the heating up and cooling off. However, it has proved disadvantageous that the wall thickness of the adapter piece employed as connecting piece must be only relatively thin in order when being melted onto the condenser that a clean melting area will be obtained as it is required for the gas-tight connection. In view of the various mechanical stresses, the possibility of a break or crack cannot be fully excluded. A repair is, however, particularly difficult when radioactive substances are subjected to the intended reaction and thereby the device itself becomes highly radioactive.

A further drawback of the heretofore known chlorinating devices consists in that due to the employment of a ceramic pipe the upper limit of the shell diameter must be approximately 40 centimeters. This limits the throughput. This is not of material importance for the working of fuel elements because the reaction vessel must for reason of criticality not have a greater diameter. If, however, the device is also to be used for other chlorinating reactions, for instance for making reactor graphites by chlorinating or for extracting non-fissionable volatile chlorides such as titanium chloride, zirconium chloride or the like from the corresponding ores or from deep sea sediments, devices for chlorinating of larger dimensions are necessary. This also holds true for the purification of pulverized graphite by removing impurities as volatile gaseous chlorides.

It is, therefore, an object of the present invention to provide a device for carrying out chlorinating reactions which will permit a greater throughput and thus a more economical operation and which furthermore will not be liable to disorders.

These and other objects and advantages of the invention will appear more clearly from the following specification in connection with the accompanying drawing diagrammatically illustrating partially in longitudinal section an embodiment of the device according to the invention.

The device according to the invention is characterized primarily in that the shell of the shaft or blast furnace and the adapter piece connecting the said furnace and the condenser are made of graphite while the shell of the furnace, the condenser, and the adapter piece which connects the shell to the condensers are arranged within a gas-tight steel casing or shell. Experience has proved that in this way a high temperature resistance or stability is realized and that if the shell is made of graphite rings or graphite bricks, at the same time a high life span can be realized. The temperature resistance may furthermore be increased by having the steel casing surrounding the shell of the furnace in spaced relationship so that an annular intermediate space or chamber is formed in which graphite wool is contained.

It has proved expedient to design the adapter piece as a cantilever-shaped support at the free end of which the condenser is arranged. In this way, it will be realized that no streases can occur between the structural elements which might otherwise result in disorders. However, if desired, the condenser could also be supported by spring elements arranged below a collecting container at the lower end of the condensers. An advantageous further development of the device according to the present invention is characterized in that bores with corrosion-resistant heating elements therein are provided in the adapter piece. In this way, also the adapter piece can be heated to the temperature prevailing in the reaction zone of the furnace. Thus, a desublimation of the chlorides in the adapter piece will be avoided. It is expedient to make the heating elements of graphite.

Referring to the drawings, the apparatus consists of a shaft furnace 1 for carrying out of chlorine reactions and a condenser post-connected as to the shaft furnace; the condenser serves for separation of reaction products withdrawn from the shaft furnace 1 during simultaneous cleaning of the reaction gases. The shaft furnace 1 consists of a shaft of graphite arranged vertically in which the material to be chlorinated becomes supplied or introduced out of the storage container 14 by way of a worm 15. For supply of chlorine gas, the shaft furnace 1 is provided with a supply conduit in the upper area and a central tube 19 with a gas connection 20 projecting into the middle range or area of the shaft furnace. The central pipe or tube 19 consists in the upper part 21 thereof, of gas-tight graphite and provides a pipe part 22 in the middle range of the shaft furnace consisting of porous graphite so that at this location the central pipe distributes the chlorine gas uniformly entering into the reaction chamber of the shaft furnace 1. The shaft furnace 1 consists of porous graphite. The support construction 23 of the shaft furnace is connected with an electrical voltage source 24 so that the same may be heated as a resistance heater. The hottest zone 2 in the shaft furnace becomes formed where the shaft furnace provides a reduced wall thickness as is the case in the middle range of the shaft furnace in the sample embodiment. In the range of the hot zone 2 of the shaft furnace 1, the working temperature amounts to approximately 1700° C.

For the chlorinated material, there is provided a material withdrawal means 16 at the lower part of the shaft furnace. Because of the porosity of the graphite wall of the shaft furnace 1 and the consequent gas permeability of the shaft furnace existing therewith, there is noted that the reaction gases arising during the reaction pass directly through the wall of the shaft furnace 1 out of the reaction chamber. The shaft furnace 1 is surrounded by a shell or mantle 3 arranged coaxially spaced with respect to the shaft furnace. The intermediate chamber 25 formed between the shaft furnace 1 and the mantle or shell 3 serves for receiving the reaction gases. From the intermediate chamber 25, the reaction gases become guided into the condenser 7 by way of a gas conduit 26 provided in an extension support or strut 6.

The extension strut or support 6 consists of graphite in the same manner as with the shell or mantle 3 and the condenser. Graphite is preferred as a work material because of the good corrosion resistance against chlorine with the existing high working temperature. The extension support or strut 6 is connected with the shell or mantle 3 at one location which is located in the area of the hot zone 2 of the shaft furnace 1. The reaction gases are withdrawn from the intermediate chamber 25 so hot that even with nominal cooling off in the gas conduit 26 there still is no condensation of component parts of the reaction gas. In order to prevent cooling off, the extension support or strut 6 surrounding the pipe 26 may be heated by graphite elements 27 positioned in bores in the strut and connected to a voltage source 28. The heating occurs so that the temperature of the reaction gases before entry into the condenser always will lie above the highest condensation temperature between the reaction products.

The extension support 6 is so constructed that the connected condenser is held by extension supports or strut means. As apparent from the drawing, the support 6 is embodied as a free carrying carrier or cantilever means at the free end of which the condenser is fastened. In an advantageous manner, the condenser in this case requires no special holding on the foundation so that the differing thermal expansion between the shaft furnace 1 and the condenser is not a problem and does not create high stresses. For safety reasons, however, spring elements 8 may be provided to engage below the condenser for support.

A supply means 29 is connected to the condenser to admit gas into the condenser chamber 7, and there a steep cooling off of the reaction gases entering into the condenser takes place. A supply means 30 is also provided for gas into the middle range of the condenser. An annular chamber 32 is formed around the wall 31 consisting of graphite. Hereby there becomes attained that no dust formed condenser products adhere or become deposited along the wall 31 of the condenser chamber. Below the condenser chamber 7 there is arranged a filter element 10 which is embodied as a hollow cylinder and is likewise consisting or porous grahite. As shown, the inner diameter of the filter element 10 either corresponds to the inner diameter of the condenser chamber or is larger than the same. The cooled reaction gas passes by way of the filter element 10 through a gas conduit 33 out of the condenser chamber. Powder formed chloride remains left in the filter element as a loose covering which gradually drops into a collecting container 11 arranged at the lower end of the condenser chamber 7 to be withdrawn therefrom. A conduit 34 may supply gas in order to convey the powder formed chloride into the collecting container 11 with the aid of the gas flowing therein.

For thermal isolation there is provided between the graphite walls, especially between the mantle 3 and the steel sleeve 5 a layer of graphite wool 4. Different thermal expansions between the shaft furnace 1 and the mantle 3 are provided for by means of compensators 12 arranged between the support construction 23 and the holding means 35. Compensators 13 are provided for the same purpose by the steel mantle 5 of the condenser and the filter mantle or shell of the filter 10 below the condenser.

The operation of the device according to the present invention will be evident from the example set forth below.

EXAMPLE

Finely powdered graphite having a 3% ash content and having 90% of its particles of a size less than 0.063 millimeters is in a continuous manner fed by means of a dosing device out of a storage container or storage bin 14 through a dosing worm 15 mounted at the head of the reaction container 1, into the graphite tube 1 which has a diameter of 30 centimeters. The graphite is discharged through a rotary trap 16. The temperature in the hot zone amounted to 1700° C. The throughput amounted to 15 kilograms of graphite per hour. Inasmuch as the hot zone has a capacity of 15 kilograms of graphite, the staying time in the hot zone amounted to one hour. The throughput of chlorine was approximately 100 liters per hour. The excessive chlorine gas was circulated by a diaphragm pump. The chlorine gas was freed from inert gases and carbon monoxide in a manner known per se by liquification. The ash content of the fine pulverous graphite dropped in view of the treatment to 0.1%. The main impurities were in the following sequence: silicon, aluminum, calcium and magnesium. Heavy metals and boron comprise less than 1 ppm respectively. The chlorine content amounted to 1%.

For purposes of removing adsorbed chlorine, the chlorinated graphite was washed with nitrogen as inert gas and was subsequently pneumatically conveyed to a dosing device of an apparatus which differs from the device according to the invention merely in that it is not followed by a condenser. The graphite passed through the hot zone which had a temperature of 1000° C., within 2 hours. The apparatus was then washed with 100 liters per hour of a mixture of 25% ammonia and 75% of nitrogen. It was ascertained that the residual chlorine content was mainly attributable to earth alkali chlorides and amounted to approximately 100 ppm. Washing with water reduced the residual chlorine content further.

It is, of course, to be understood that the present invention is, by no means, limited to the specific example set forth above and the specific illustration in the drawing but also comprises any modifications within the scope of the appended claims.

What we claim is:

1. An apparatus for carrying out chlorinating reactions which includes in combination: a shaft furnace comprising a vertical graphite tube having a resistance heating zone, a supply for material to be chlorinated connected to the upper part of the shaft furnact to feed material to said tube, means for feeding chlorine, a graphite shell surrounding said tube, condenser means communicating with said furnace and having an integral tubular adapter piece connecting said condenser means to said furnace, said condenser means and adapter piece being made of graphite with said adapter piece being fixed to said graphite shell at one end and extending outwardly from said furnace to its integral connection to said condenser means on the other end, a withdrawal outlet for the reaction product, a gas tight steel casing surrounding said shell and said condenser means and said adapter piece, said adapter piece extending horizontally outwardly from said shell, said condenser means depending from said adapter piece, and means to heat said adapter piece and incorporated therewith, said adapter piece forming a support for said condenser means.

2. An appartus in combination as in claim 1 in which said adapter piece is provided with a plurality of bores, and in which corrosion resistant heating elements are arranged in said bores.

3. An apparatus in combination as in claim 1 in which said steel casing surrounds said shell in radially spaced relationship thereto so as to form therewith an annular space, and graphite wool provided in said annular space.

4. An apparatus in combination as in claim 2 in which said heating elements are of graphite.

* * * * *